(12) United States Patent
Ringwald et al.

(10) Patent No.: US 8,560,182 B2
(45) Date of Patent: Oct. 15, 2013

(54) IMPLEMENT HEIGHT CONTROL ADJUSTMENT ON AGRICULTURAL VEHICLES

(75) Inventors: Justin Ringwald, Ellinwood, KS (US); Frank Dupire, Manheim, PA (US); James Keppers, Avon, MN (US)

(73) Assignee: CNH America LLC, New Holland, PA (US)

(*) Notice: Subject to any disclaimer, the term of this patent is extended or adjusted under 35 U.S.C. 154(b) by 179 days.

(21) Appl. No.: 12/778,667

(22) Filed: May 12, 2010

(65) Prior Publication Data

US 2010/0287900 A1  Nov. 18, 2010

Related U.S. Application Data

(60) Provisional application No. 61/216,520, filed on May 18, 2009.

(51) Int. Cl.
*A01D 34/00* (2006.01)

(52) U.S. Cl.
USPC ............................ 701/50; 56/10.2 E; 56/17.1

(58) Field of Classification Search
USPC ............... 56/10.2 D, 10.2 E, 17.1, 28; 701/50
See application file for complete search history.

(56) References Cited

U.S. PATENT DOCUMENTS

| | | | |
|---|---|---|---|
| 3,659,618 A | 5/1972 | Kobald et al. | |
| 3,722,193 A | 3/1973 | Strubbe | |
| 4,323,136 A | 4/1982 | Van Der Lely et al. | |
| 4,437,295 A | 3/1984 | Rock | |
| 4,776,153 A | 10/1988 | DePauw et al. | |
| 4,944,141 A | 7/1990 | Orlando et al. | |
| 4,967,544 A * | 11/1990 | Ziegler et al. | 56/10.2 R |
| 5,025,614 A | 6/1991 | Orsborn et al. | |
| 5,115,628 A * | 5/1992 | Garter et al. | 56/10.2 |
| 5,343,675 A | 9/1994 | Norton | |
| 5,463,854 A * | 11/1995 | Chmielewski et al. | 56/10.2 |
| 5,469,921 A * | 11/1995 | Orbach et al. | 172/4 |
| 5,473,870 A * | 12/1995 | Panoushek et al. | 56/10.2 |
| 5,518,453 A | 5/1996 | Tribbett | |
| 5,577,373 A * | 11/1996 | Panoushek et al. | 56/10.2 |
| 5,704,200 A | 1/1998 | Chmielewski, Jr. et al. | |
| 5,794,421 A * | 8/1998 | Maichle | 56/10.2 |
| 5,937,621 A * | 8/1999 | Eggenhaus | 56/10.2 |
| 6,141,612 A * | 10/2000 | Flamme et al. | 701/50 |
| 6,289,659 B1 | 9/2001 | Fox | |
| 6,588,187 B2 | 7/2003 | Engelstad et al. | |
| 6,615,569 B1 | 9/2003 | Carlz | |
| 6,615,570 B2 * | 9/2003 | Beck et al. | 56/10.2 |
| 6,871,483 B1 * | 3/2005 | Panoushek | 56/10.2 |
| 2006/0248868 A1 * | 11/2006 | Otto et al. | 56/10.2 |
| 2008/0155954 A1 * | 7/2008 | Schlipf | 56/10.2 |
| 2009/0069988 A1 | 3/2009 | Strosser | |

* cited by examiner

*Primary Examiner* — Thomas B Will
*Assistant Examiner* — Mai Nguyen
(74) *Attorney, Agent, or Firm* — Patrick M. Sheldrake

(57) ABSTRACT

An adjustable height implement system for an agricultural vehicle. A harvesting implement has an adjustable height. A control system is operably connected in a first operating mode to the harvesting implement to adjust the height of the harvesting implement with respect to the ground. The control system is operably connected in a second operating mode to the harvesting implement to maintain at least a predetermined distance between the harvesting implement and the ground. The second operating mode is engaged in response to the agricultural vehicle satisfying at least one predetermined vehicle operating parameter.

19 Claims, 4 Drawing Sheets

IMPLEMENT HEIGHT CONTROL ADJUSTMENT ON AGRICULTURAL VEHICLES

CROSS-REFERENCE TO RELATED APPLICATIONS

This application claims the benefit of U.S. Provisional Application No. 61/216,520, filed May 18, 2009.

FIELD OF THE INVENTION

The present invention relates to the height control operation of an implement on an agricultural vehicle. In particular, the invention relates to a system and method for maintaining a predetermined distance between an implement on an agricultural vehicle and the ground when ongoing crop harvesting is not occurring.

BACKGROUND OF THE INVENTION

The operation of most agricultural vehicles requires substantial operational involvement and control by the operator. For example, in a cotton harvester the operator is required to control the direction and speed of the vehicle while also controlling the height of the harvesting drum, the amount of harvested crop stored on the vehicle and a variety of other operation conditions. Accordingly, to reduce the effort required by the operator, it is useful to automate as many tasks performed by the operator as possible.

Conventional cotton harvesters include two or more harvesting implements commonly supported for vertical movement on a fore-and-aft wheeled frame of the harvester. Each harvesting implement includes a harvesting assembly defining a plant passage and a harvesting mechanism arranged within the housing. As the cotton harvester is driven across the cotton field, a row of cotton plants passes through the passage, and the harvesting mechanism removes the cotton therefrom. Cotton grows along the entire height of the cotton plant. At the lower end, the cotton grows barely off the ground and sometimes on the ground. The harvesting implements, therefore, follow as close to the ground as possible so as to pick or harvesting is as much of the cotton from the plants.

The ground over which the harvester is driven is usually uneven. Accordingly, if the harvesting implement is set for a lowermost point of depression on the ground, stalk lifters extending from a forward end of the harvesting implement will tend to "dig into" high points of ground contour. As the harvester is driven across the field, the wheels on the harvester frame ride between adjacent rows of cotton plants. In softer muddy conditions, the wheels of the harvester furthermore deform the field into slight recesses and valleys or raised ridges. As will be appreciated, proper positioning of the harvesting implement relative to the ground contour is further complicated in such undulating field conditions.

To optimize efficiency during the harvesting operation, cotton harvesters are known to include a harvesting implement height control system for automatically controlling the height of the harvesting implement relative to the ground contour. The elevation of the harvesting implement is primarily controlled by a lift mechanism actuated in accordance with ground contours. Variations of the ground contour are sensed by a ground engaging element, such as a shoe, mounted on the harvesting implement in a manner to press on the ground and be positionally displaced in response to variations of the ground contour profile.

During the harvesting process for cotton, it is generally necessary to maintain the harvesting implements in close proximity to the ground (0.5-3.0 inches) to ensure optimal harvesting. Upon reaching the end of the harvested row, the operator typically disengages automatic height control, with the operator's attention focused on reversing the directional headings of the harvester and effecting realignment of the harvesting implement with the next row to continue harvesting the cotton crop, prior to re-engaging the automatic implement height control system. While the harvester is in this transitional stage, it is not necessary to maintain the harvesting implements in such close proximity to the ground, as ongoing crop harvesting is not occurring. Further, a change in terrain may cause damage to the harvesting implements.

Accordingly, it would be desirable to provide an automated implement height adjustment arrangement and method that provides protection of the harvesting implement while ongoing crop harvesting is not occurring.

SUMMARY OF THE INVENTION

The accompanying drawings, which are incorporated in and constitute a part of this specification, illustrate the preferred embodiment of the invention, and together with the description, serve to explain the principles of the invention.

One embodiment of the present invention includes an adjustable height implement system for an agricultural vehicle. A harvesting implement has an adjustable height. A control system is operably connected in a first operating mode to the harvesting implement to adjust the height of the harvesting implement with respect to the ground. The control system is operably connected in a second operating mode to the harvesting implement to maintain at least a predetermined distance between the harvesting implement and the ground. The second operating mode is engaged in response to the agricultural vehicle satisfying at least one predetermined vehicle operating parameter.

Another embodiment of the present invention includes a method including providing an agricultural vehicle having an adjustable height implement system including a harvesting implement having an adjustable height. A control system is operably connected in a first operating mode to the harvesting implement to adjust the height of the harvesting implement with respect to the ground. The control system is operably connected in a second operating mode to the harvesting implement to maintain at least a predetermined distance between the harvesting implement and the ground. The second operating mode is engaged in response to the agricultural vehicle satisfying at least one predetermined vehicle operating parameter. The method further includes satisfying the at least one predetermined vehicle operating parameter and engaging the control system in the second operating mode.

Still another aspect of the present invention includes an agricultural vehicle including an adjustable height implement system for an agricultural vehicle. A harvesting implement has an adjustable height. A control system is operably connected in a first operating mode to the harvesting implement to adjust the height of the harvesting implement with respect to the ground. The control system is operably connected in a second operating mode to the harvesting implement to maintain at least a predetermined distance between the harvesting implement and the ground. The second operating mode is engaged in response to the agricultural vehicle satisfying at least one predetermined vehicle operating parameter.

Another advantage of embodiments of the present invention is a reduction in unnecessary strain on the equipment.

DETAILED DESCRIPTION OF THE INVENTION

Figure 1:
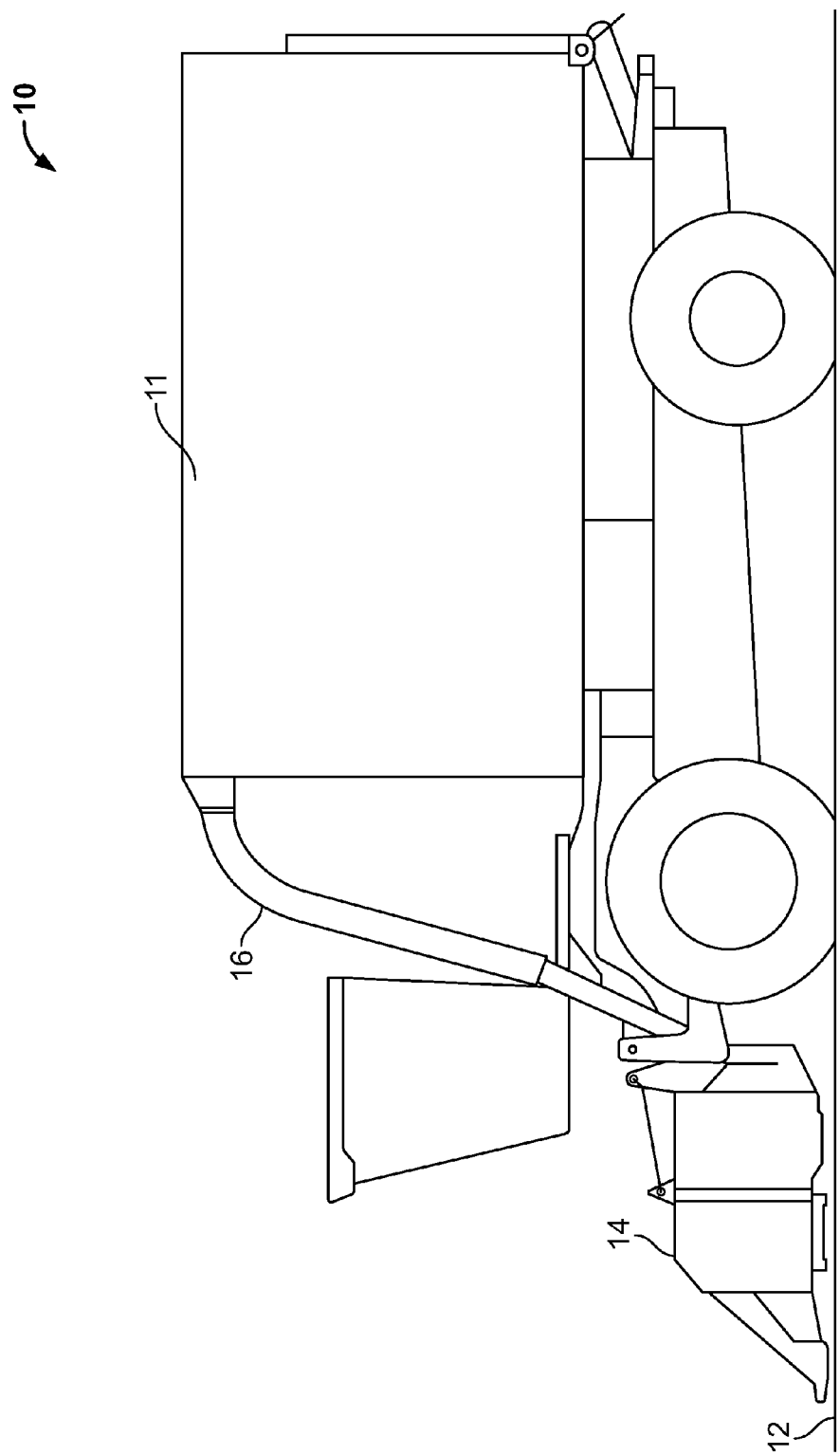
FIG. 1 illustrates an agricultural vehicle including a harvesting implement having an automatically adjustable height.

Reference will now be made in detail to the present preferred embodiment of the control circuit of the invention, examples of which are illustrated in the accompanying drawings. Wherever possible, the same reference characters will be used throughout the drawings to refer to the same or like parts.

Height control systems on cotton harvesters or other agricultural harvesters maintain a desired ground clearance and should operate in a manner that minimizes or eliminates potential damage to the implements or drums. As will be discussed in more detail below, the system of the present invention includes an automated height adjustment in response to the ground distance sensors when the system operates in a first operating mode, and further includes maintaining the implements or drums at least at a predetermined distance between the implement and ground in a second operating mode, such as when the automatic height control is disengaged. The arrangement of automated height adjustment may be any arrangement or system known for providing height control in response to the distance to the ground. "Height", as used herein is meant to be a unit of distance corresponding to the distance between a component, such as a harvesting implement, and the ground. Height is not limited to an absolute number and may be relative to other components or calculated based on a plurality of measurements. The control system may include sensors providing measurements of ground control using physical measurements or digital signals from optical or other sensors. The control system is not limited to a fully automated system, but may also include a system that includes manual or override adjustments remotely or by the operator. The automated height control according to the present disclosure includes a control system that is capable of having altering rates of adjustment. That is, the height control system according to the present disclosure includes a rate of raising or lowering the implement, for example to a height set point, that may be adjusted to be a greater or lesser rate of speed.

"Distance", as used herein is meant to correspond to a unit of space separating a component, such as a harvesting implement, and the ground. While not intending to be limiting, for purposes of distinguishing between the system when operating in a first operating mode, the term height will typically be used, and when the system is operating in a second operating mode, the term distance will typically be used. However, it is to be understood that the terms may be used interchangeably.

In one embodiment, the system according to the present disclosure includes known height sensor arrangements to detect changes in the terrain over which the implement is moving and calculates the distance between the implement and the ground. The system utilizes the measured or calculated distance from the ground to determine the desired height of the implement. The system then obtains the vehicle ground speed. The ground speed may be determined using any suitable technique for determining ground speed. The ground speed is determined in order to calculate the rate at which the implement should be moved to the desired height. Once the height is determined and the rate at which the height adjustment is to be made, then the system adjusts the height of the implement at the determined rate.

One embodiment includes a cotton harvester. A representative cotton harvesting vehicle is shown in FIG. 1, including a cotton compacting structure and bin 11 for receiving and holding cotton harvested by a plurality of picker implements 14 arrayed across a forward end of vehicle 10. The cotton is conveyed from harvesting implements 14 through a plurality of parallel ducts 16 by air flows through the ducts. The cotton harvester travels along ground 12 and monitors a height of the implement 14 above the ground 12. Automatic controls provide height adjustment of implement 14 above ground 12.

Figure 2:
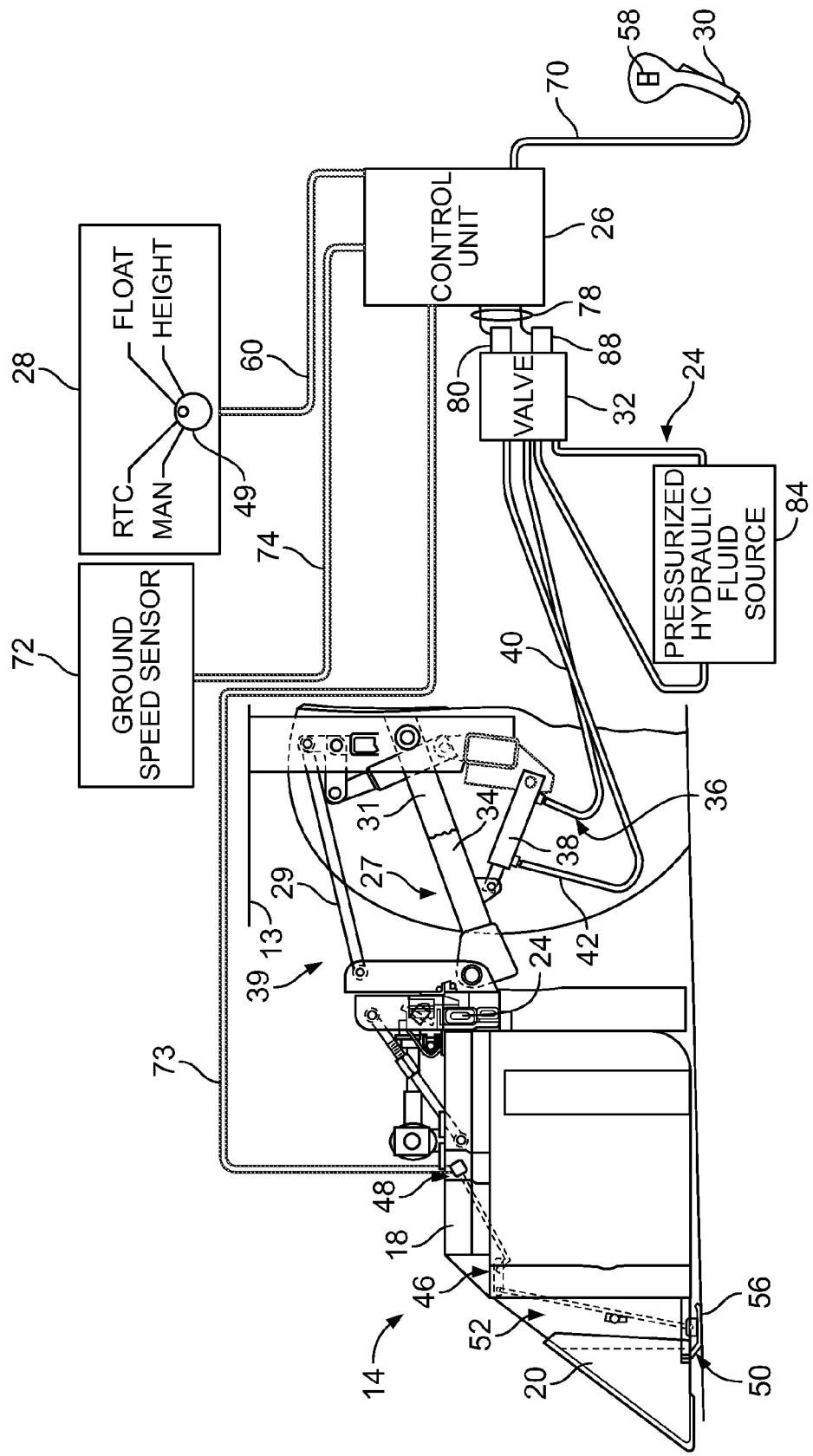
FIG. 2 is a schematic representation of an embodiment of an implement position control system.

FIG. 2 is a schematic representation of the preferred embodiment of the implement position control system 24. Control system 24 includes a microprocessor based control unit 26, a man-controller interface 28, a vehicle direction and speed control lever 30, a hydraulic control valve 32, and an implement lift mechanism 39 (e.g., hydraulic lift cylinders, cable lift arrangements, hydraulic motor and gear arrangements, or electric motor and gear arrangements).

One or more harvesting implements 14 may be supported at a forward end of frame 13. Each harvesting implement 14 is a conventional structure including a fore-and-aft extending housing assembly 18 which rotatably supports a harvesting mechanism (not shown) and other associated mechanisms for stripping or picking cotton from the plants as the harvester is driven across the field. A pair of stalk lifters 20 extend forwardly from a housing assembly 18 for guiding the cotton plants through a plant passage defined by the housing assembly 18.

In addition to man-controller interface 28, system 24 also includes a raise and lower switch 58 which may be mounted in lever 30. By way of example, raise and lower switch 58 is a centrally biased momentary contact switch. As shown in FIG. 2, man-controller interface 28 is coupled to unit 26 by a signal bus 60 and switch 58 may be coupled to unit 26 by a signal bus 70.

The control system for providing height control includes a control unit 26, man-controller interface 28, control lever 30, and valve 32 as well as the associated components that cooperatively provide height control to the implement 14. Control unit 26 is also coupled to ground speed sensor 72 by a signal bus 74. The ground speed sensor 72 may include any sensor or device capable of determining ground speed of the vehicle 10. For example, the ground speed sensor 72 may include a global positioning system (GPS) device, a shaft or motor speed indicator or any other device suitable for measuring a parameter suitable for determining or estimating ground speed. The ground speed can be directly measured, calculated or indirectly measured. In addition, the control unit is coupled to signal receiving assembly 48 by signal bus 73. The signal receiving assembly 48 provides a ground height measurement that is usable by the control unit 26 to determine the desired height of implement 14. The ground height measurement is not limited to the arrangement shown and may include any known arrangement for measuring or determining the height of the implement from ground 12.

Control unit 26 is in communication with control valve 32 which includes a raising solenoid 80 and a lowering solenoid 82 to which signal bus 78 is connected. Control unit 26 may apply pulse width modulated signals to solenoids 80 and 82 which allow valve 32 to control the flow of fluid between a pressurized hydraulic fluid source 84 and lift device 38. In the present embodiment, source 84 is a hydraulic pump connected in series with a hydraulic fluid storage tank and appropriate filters. The specific hydraulic arrangement is not limited. In addition, the invention is not limited to hydraulic lift mechanisms and may include electrical motor lift mechanism, pneumatic systems or any other arrangement that is suitable for lifting harvesting implements.

A lift mechanism 39, as shown in FIG. 2, is provided for supporting the harvesting implement 14 for vertical movement between lowered and raised elevational positions. The mounting and supporting system preferably includes a lift assembly 27 and an elongated tension arm 29 connected to the lift assembly.

The lift assembly operates essentially as a parallelogram type linkage which is pivotally connected to and extends forwardly from frame 13 of the vehicle 10. As illustrated in FIG. 2, the lift assembly 27 includes a pair of laterally spaced upper tension arms 29 extending generally parallel to a pair of laterally spaced lower lift arms 31, 34. The tension arms 29 have an effective length which is approximately equal to that of the lift arms 31 and 34, respectively, and, therefore, the harvesting implements 14 connected thereto are maintained in a generally level attitude during field operation as they are moved between lower and raised elevational positions. The harvesting implements 14 are preferably individually connected to the tension arm 29 which, as illustrated, is suitably connected to the lift assembly 27.

A pressurized hydraulic system 36 is preferably provided for adjusting the elevation of the harvesting implement 14. As shown in FIG. 2, the hydraulic system 36 includes hydraulic lift device 38 preferably in the form of linearly distendable hydraulic cylinders connected between the frame 13 and the implement 14. Conduits 40, 42 connect the valve 32 to the lift device 38.

During a harvesting operation, operation of the lift device 38 and thereby the harvesting elevation of the harvesting implement 14 is automatically controlled by a harvesting implement height sensing system generally indicated by reference numeral 46. As shown in FIG. 2, the height sensing system 46 includes a signal receiving assembly 48, a signal transmitting mechanism 50, and a linkage assembly 52 interconnecting the signal receiving assembly 48 and the signal transmitting mechanism 50.

In one embodiment, the signal transmitting mechanism 50 includes a ground contour sensing shoe or element 56 pivotally connected to the harvesting implement. The ground engaging element 56 is responsive to the ground contour and is operable to position control valve 32 within its range of movement to effect harvester implement elevation correlated with the vertical movement of the ground engaging element relative to the harvesting implement.

It is to be understood that application Ser. No. 12/686,491 titled Ground Speed Implement Height Control Adjustment Rate On Agricultural Vehicles, and assigned to Applicant, is incorporated by reference in its entirety herein.

Figure 3:
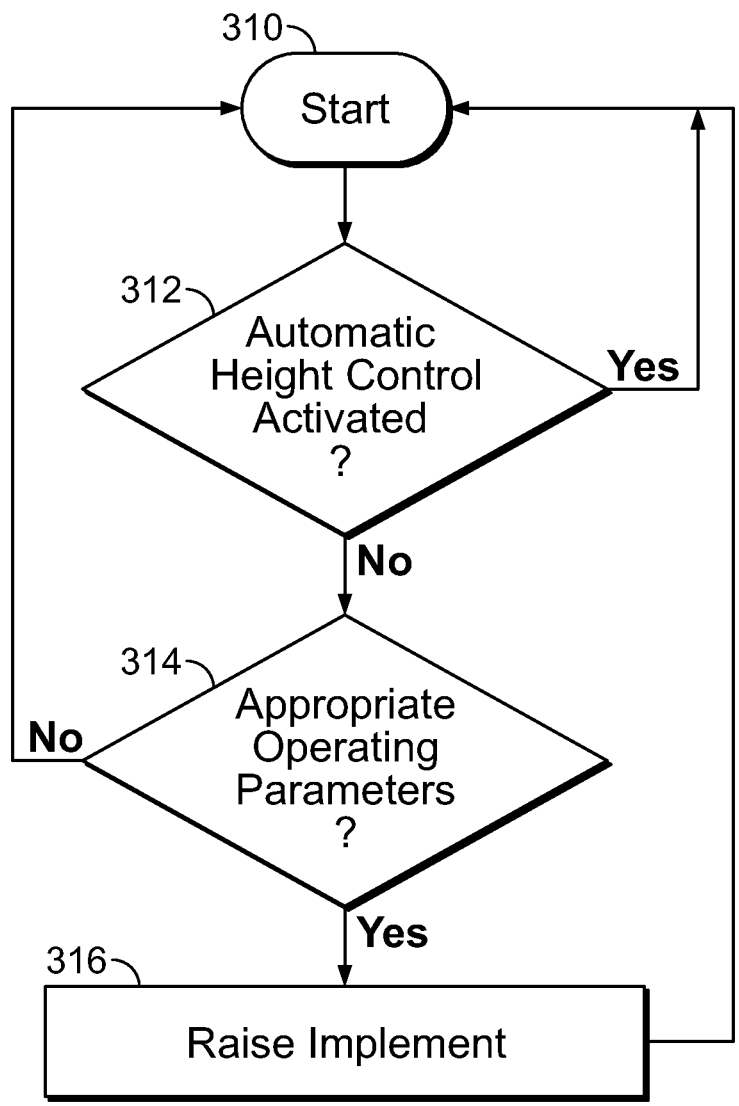
FIG. 3 is a flow chart illustrating a method according to an embodiment of the invention.

FIG. 3 shows a method according to an embodiment of the present invention. The method begins when the system for height adjustment rate is activated or as the system is called upon by the control unit 26 (step 310). The method first determines whether the automated height control system, also referred to as a first operating mode, is activated (step 312). If the automated height control system is activated (i.e., "YES" in FIG. 3), the method returns to step 310. The method is intended for applications in which step 312 is deactivated or disengaged, such as when manual adjustment is being provided. Alternately, manual adjustment may be provided once the operator completes harvesting a row of crops, and ongoing crop harvesting is not occurring, and is repositioning the vehicle prior to resuming or engaging in ongoing crop harvesting of the next row of crops. In such a circumstance, the operator would typically activate the automated height control system upon re-engagement with the crops or resuming harvesting, also referred to as ongoing harvesting, which is to be distinguished from vehicle repositioning performed upon the conclusion of harvesting a row of crops and prior to harvesting the next row of crops. If the automated control system is inactivated (i.e., "NO" in FIG. 3), the method then determines whether appropriate operating parameters are in place (step 314). The determination of whether appropriate operating parameters are in place primarily to prevent inadvertent execution of the method, i.e., raising an implement in step 316. For example, such operating parameters may be safety-related, such as ensuring the operator safety belt is coupled or that a sensor associated with confirming an operator is positioned in the cab of the vehicle, i.e., "weight in the seat" condition is satisfied. In another embodiment, an operating parameter may require the vehicle to be in motion, by itself, and/or in combination with other parameters, as required or appropriate. In response to appropriate operating parameters being in place or otherwise satisfied (step 314), the vehicle implement may be raised (step 316). The condition for raising the vehicle implement is related to the implement maintaining at least a minimal or predetermined distance between the implement and the ground. In other words, the method only permits vertically raising the implement while the conditions of the method are continuously satisfied with respect to steps 312 and 314. That is, so long as the conditions of the method are continuously satisfied, it is not necessary that the implement is further raised, although the implement is prevented from being lowered. The method utilizes components previously discussed to monitor the distance between the implement and the terrain, and only permits the implement to be raised in response to the implement failing to maintain a minimal or predetermined distance between the implement and the ground. The method is continuously self-monitoring to ensure that step 312 is not satisfied (disengaged) and that step 314 is satisfied (appropriate operating parameters). In addition, the implement may only be raised (step 316) when the method is operating in a second operating mode, in that the automatic height control (step 312) is disengaged or deactivated.

Figure 4:
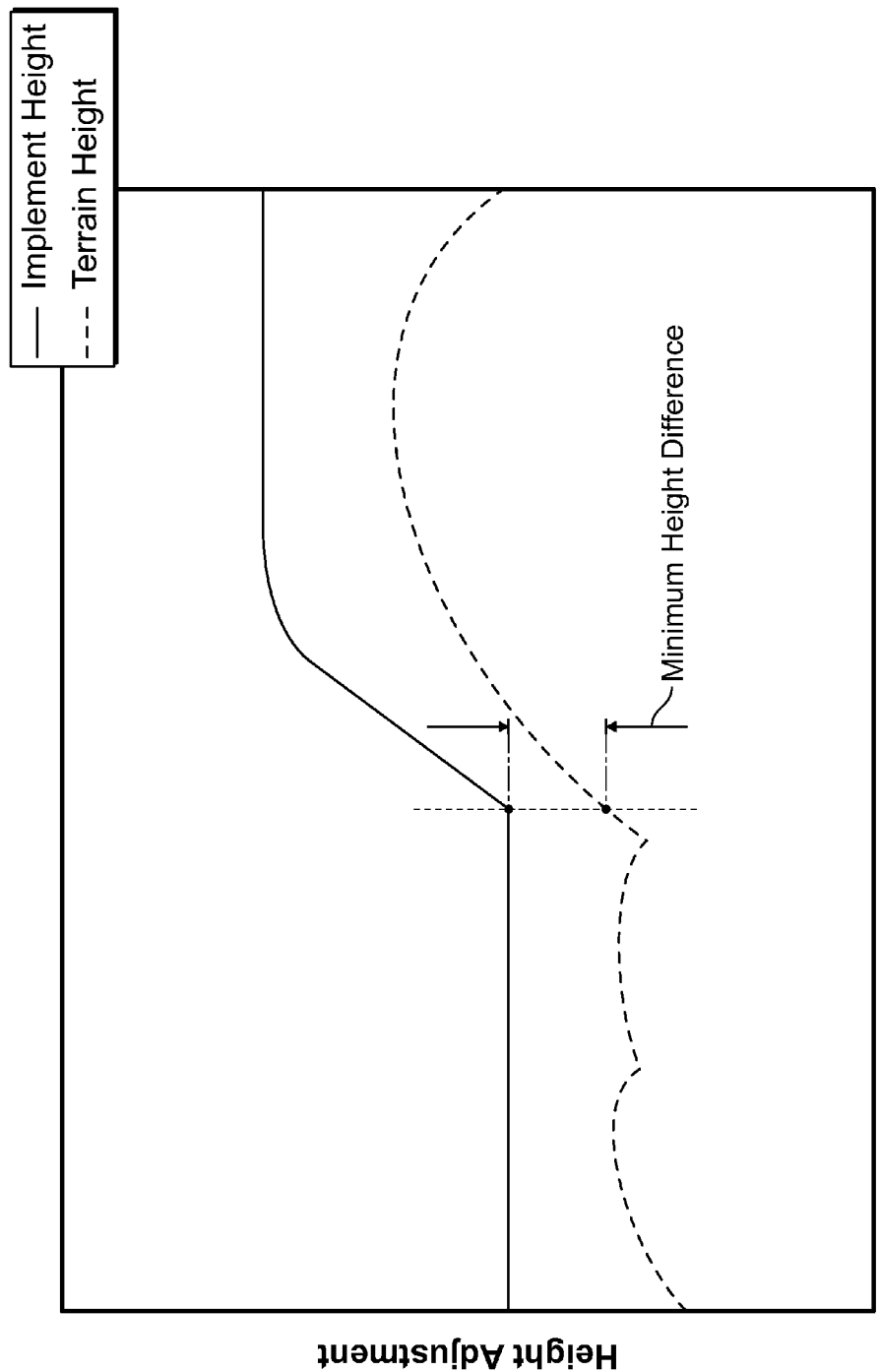
FIG. 4 illustrates an exemplary relationship between a minimum difference in height between the implement and the terrain.

Referring to FIG. 4, the difference in height between the implement and the terrain or ground during continuous implementation of the method is shown graphically with height adjustment corresponding to the Y axis, and the X-axis corresponding to time, as the vehicle is moving (in satisfaction of one of the operating parameters of the method). As shown, the terrain is uneven (shown in dotted line), i.e., varies in vertical position while the vertical position of the implement (shown in solid line) is maintained at an originally designated vertical position, or the vertical position at which the method is executed, until the distance between the terrain and the implement is less than a minimum distance. In response to the distance between the terrain and the implement being less than a minimum distance, the implement is raised until the predetermined minimum distance is satisfied, at which time the implement does not need to be further vertically raised. In another embodiment, the method may be configured so that the rate at which the implement is raised as a function of ground speed.

The ground speed can be determined using ground speed sensor 72 (see FIG. 2), which may include a global positioning system (GPS) device, a shaft or motor speed indicator or any other device suitable for measuring a parameter suitable for determining or estimating ground speed. The ground speed can be directly measured, calculated or indirectly measured.

The relationship between the rate of height adjustment and ground speed can vary with respect to the system on which it is utilized. The relationship is preferably such that the greater the ground speed, the greater the rate of height adjustment. For example, the rate of height adjustment can vary linearly with respect to the ground speed. However, the relationship between height adjustment rate and ground speed need not be linear and may be a non-linear or a discontinuous relationship. In another exemplary embodiment, the relationship between height adjustment rate and ground speed may be altered at different rates at different areas of ground speed. The rate of height adjustment may be a direct input to the control unit, as a particular speed at which the implement 14 is raised or lowered. Alternately, the rate of height adjustment may be a factor or a variable input into a control algorithm. The rate of height adjustment may be a multiplier for a control gain or error rate. The resultant control function would result in a height adjustment that is raised or lowered at a rate corresponding to the control algorithm adjusted by the multiplier or factor corresponding to the rate of height adjustment determined for the particular ground speed. For example, the control unit 26 may include a product/integral/differential (PID) control loop into which an error signal is passed. In this embodiment, the PID control loop includes associated gains for each of the components of the control loop. The output for the PID control loop may be used to determine an output to valve 32. The height adjustment rate may be altered by multiplying the error and/or control loop gains by a factor corresponding to ground speed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An adjustable height implement system for an agricultural vehicle comprising:
    a harvesting implement having an adjustable height;
    a control system operably connected in a first operating mode to the harvesting implement to automatically adjust the height of the harvesting implement with respect to the ground based on a detected height of the implement from the ground determined from a height sensing system;
    the control system is operably connected in a second operating mode to the harvesting implement and programmed to determine the height of the implement from the ground using the height sensing system and maintain at least a predetermined distance between the harvesting implement and the ground wherein when the second is engaged and the height is less than the predetermined distance, the control system automatically raises the implement to a first position with respect to the vehicle that is at or above the predetermined distance and the implement is held in the first position while the control system remains in the second mode and the implement height is greater than the predetermine distance; and
    wherein the second operating mode being engaged in response to the agricultural vehicle satisfying at least one predetermined vehicle operating parameter.

2. The system of claim 1, wherein the at least one predetermined operating parameter is that the first mode is inactive and one of an operator safety belt is coupled, a predetermined weight is detected upon an operator seat or the vehicle is traveling above a particular speed.

3. The system of claim 1, wherein the second operating mode is engaged when ongoing crop harvesting is not occurring.

4. The system of claim 1, wherein the at least a predetermined distance between the harvesting implement and ground is maintained while the second operating mode is continuously engaged.

5. The system of claim 1, further comprising a sensor configured to determine a ground speed of the agricultural vehicle, wherein the control system alters a rate of change of distance between the harvesting implement and the ground in response to the determined ground speed.

6. The system of claim 5, wherein the rate of change of distance between the harvesting implement and the ground in response to ground speed is a multiplier communicated to the control system.

7. The system of claim 5, wherein the rate of change of distance between the harvesting implement and the ground in response to ground speed is a multiplier to an error rate measurement of the control system.

8. The system of claim 1, wherein the rate of change of distance between the harvesting implement and the ground in response to ground speed is altered linearly with respect to ground speed.

9. The system of claim 1, wherein the rate of change of distance between the harvesting implement and the ground in response to ground speed is altered nonlinearly with respect to ground speed.

10. The system of claim 1, wherein the at least one predetermined vehicle operating parameter includes the vehicle being selectably placed in driven movement with respect to the ground.

11. A method comprising:
    providing an agricultural vehicle having an adjustable height implement system comprising:
        a harvesting implement having an adjustable height;
        a control system operably connected in a first operating mode to the harvesting implement to automatically adjust the height of the harvesting implement with respect to the ground based on a detected height of the implement from the ground determined from a height sensing system; and
        the control system operably connected in a second operating mode to the harvesting implement and programmed to determine the height between the implement and the ground using the height sensing system and maintain at least a predetermined distance between the harvesting implement and the ground, the second operating mode being engaged in response to the agricultural vehicle satisfying at least one predetermined vehicle operating parameter; wherein when the second mode is engaged and the height is less than the predetermined distance the control system automatically raises the implement to a first position at or above the predetermine distance and the implement is held in the first position until the implement height is less than the predetermine distance or the second mode is exited; and satisfying the at least one predetermined vehicle operating parameter; and engaging the control system in the second operating mode.

12. The method of claim 11, wherein the agricultural vehicle is a cotton harvester.

13. The method of claim 11, wherein the first operating mode is engaged during ongoing crop harvesting.

14. The method of claim 11, wherein the second operating mode is engaged when ongoing crop harvesting is not occurring.

15. The method of claim 11, wherein achieving the at least one predetermined vehicle operating parameter includes placing the vehicle in driven movement with respect to the ground.

16. The system of claim 11, wherein the at least a predetermined distance is maintained while the second operating mode is continuously engaged.

17. The method of claim 11, further comprising providing a sensor configured to determine a ground speed of the agricultural vehicle, wherein the control system alters a rate of change of distance between the harvesting implement and the ground in response to the determined ground speed.

18. The method of claim 17, wherein the rate of change of distance between the harvesting implement and the ground in response to ground speed is a multiplier communicated to the control system.

19. An agricultural vehicle comprising:

an adjustable height implement system for the agricultural vehicle;

a harvesting implement having an adjustable height;

a control system operably connected in a first operating mode to the harvesting implement to automatically adjust the height of the harvesting implement with respect to the ground based on a detected height of the implement from the ground determined from a height sensing system;

the control system is operably connected in a second operating mode to the harvesting implement and programmed to determine the height between the implement and the ground using the height sensing system and maintain at least a predetermined distance between the harvesting implement and the ground wherein when the second mode is engaged and the height is less than the predetermined distance the control system is configured to automatically raise the implement to a first position with respect to the vehicle and the implement is held in the first position until the implement height is less than the predetermined distance or the second mode is exited; and wherein the second operating mode being engaged in response to the agricultural vehicle satisfying at least one predetermined vehicle operating parameter.

* * * * *